United States Patent
Taylor

(10) Patent No.: US 9,663,172 B2
(45) Date of Patent: May 30, 2017

(54) ATV HAVING ARRANGEMENT FOR A PASSENGER

(71) Applicant: Polaris Industries, Inc., Medina, MN (US)

(72) Inventor: Scott D. Taylor, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/562,550

(22) Filed: Dec. 5, 2014

(65) Prior Publication Data

US 2015/0091286 A1    Apr. 2, 2015

Related U.S. Application Data

(60) Continuation of application No. 13/464,777, filed on May 4, 2012, now Pat. No. 8,905,435, which is a division of application No. 12/012,587, filed on Feb. 4, 2008, now abandoned.

(51) Int. Cl.
| | |
|---|---|
| *B60R 11/00* | (2006.01) |
| *B62J 11/00* | (2006.01) |
| *B62J 25/00* | (2006.01) |
| *B62K 5/01* | (2013.01) |
| *B62J 7/04* | (2006.01) |
| *B62J 7/08* | (2006.01) |

(52) U.S. Cl.
CPC .............. *B62J 11/00* (2013.01); *B60R 11/00* (2013.01); *B62J 7/04* (2013.01); *B62J 7/08* (2013.01); *B62J 25/00* (2013.01); *B62K 5/01* (2013.01); *B60R 2011/0001* (2013.01); *B60R 2011/0052* (2013.01); *Y10T 292/0899* (2015.04)

(58) Field of Classification Search
CPC .......... B60R 2011/0052; B60R 2011/04; B62J 11/00

See application file for complete search history.

(56) References Cited

U.S. PATENT DOCUMENTS

| | | |
|---|---|---|
| 3,406,885 A | 10/1968 | Zurmuhlen |
| 4,171,077 A * | 10/1979 | Richard, Jr. .............. B60R 9/10 |
| | | 211/18 |
| 4,455,049 A | 6/1984 | Martin |
| | (Continued) | |

FOREIGN PATENT DOCUMENTS

EP        1878645 A        1/2008

OTHER PUBLICATIONS

International Search Report and Written Opinon issued by the European Patent Office, Rijswijk, Netherlands, Jun. 15, 2009, for International Application No. PCT/US2009/000677; 27 pages.

(Continued)

*Primary Examiner* — Erez Gurari
(74) *Attorney, Agent, or Firm* — Faegre Baker Daniels LLP

(57) ABSTRACT

An all-terrain vehicle includes a plurality of ground-engaging members and a frame supported by the plurality of ground-engaging members and having a front end and a rear end. The all-terrain vehicle further includes a straddle seat coupled to the frame and an attachment rack supported by the frame. The attachment rack has a first portion which defines an outer surface of the attachment rack and is comprised of a first material and a second portion which is positioned at least partially inward of the first portion and is comprised of a second material.

18 Claims, 18 Drawing Sheets

(56) References Cited

U.S. PATENT DOCUMENTS

| | | |
|---|---|---|
| 5,964,172 A | 10/1999 | Ikeda |
| 6,126,052 A * | 10/2000 | Toivola .................... B60R 9/08 224/309 |
| 6,296,163 B1 | 10/2001 | Kitao |
| 6,755,269 B1 | 6/2004 | Davis et al. |
| 6,868,584 B2 | 3/2005 | Trottier |
| 6,913,286 B2 | 7/2005 | Kramer |
| 7,055,454 B1 | 6/2006 | Whiting |
| 7,121,371 B2 | 10/2006 | Rondeau et al. |
| 7,258,192 B2 | 8/2007 | Davis et al. |
| 7,331,418 B2 | 2/2008 | Audet |
| 7,377,570 B2 | 5/2008 | Rondeau et al. |
| 7,506,714 B2 | 3/2009 | Davis et al. |
| 7,596,448 B2 | 9/2009 | Suzuki et al. |
| 2002/0070255 A1 | 6/2002 | Hebert |
| 2003/0151278 A1 | 8/2003 | Bertrand et al. |
| 2004/0031640 A1 | 2/2004 | Tweet |
| 2004/0112668 A1 | 6/2004 | Rondeau et al. |
| 2004/0232684 A1 | 11/2004 | Curl |
| 2004/0239088 A1 | 12/2004 | Rondeau et al. |
| 2005/0247506 A1 | 11/2005 | Rondeau et al. |
| 2006/0066122 A1 | 3/2006 | Wiseman |
| 2007/0045368 A1 | 3/2007 | Lavelle |
| 2011/0155777 A1 * | 6/2011 | Whiting .................... B62J 9/00 224/401 |

OTHER PUBLICATIONS

International Preliminary Report on Patentability issued by The International Bureau of WIPO, Geneva, Switzerland, Aug. 10, 2010, for International Application No. PCT/US2009/000677; 16 pages.
Polaris Brochure for ATVs; Accessories; Apparel; 2007 ©; 40 pages.
The 2006 Polaris ATV Handbook; 2005 ©; 44 pages.
Office Action issued by the Australian Government IP Australia, dated Aug. 18, 2016 for related Australian Patent Application No. 2015200419; 5 pages.

* cited by examiner

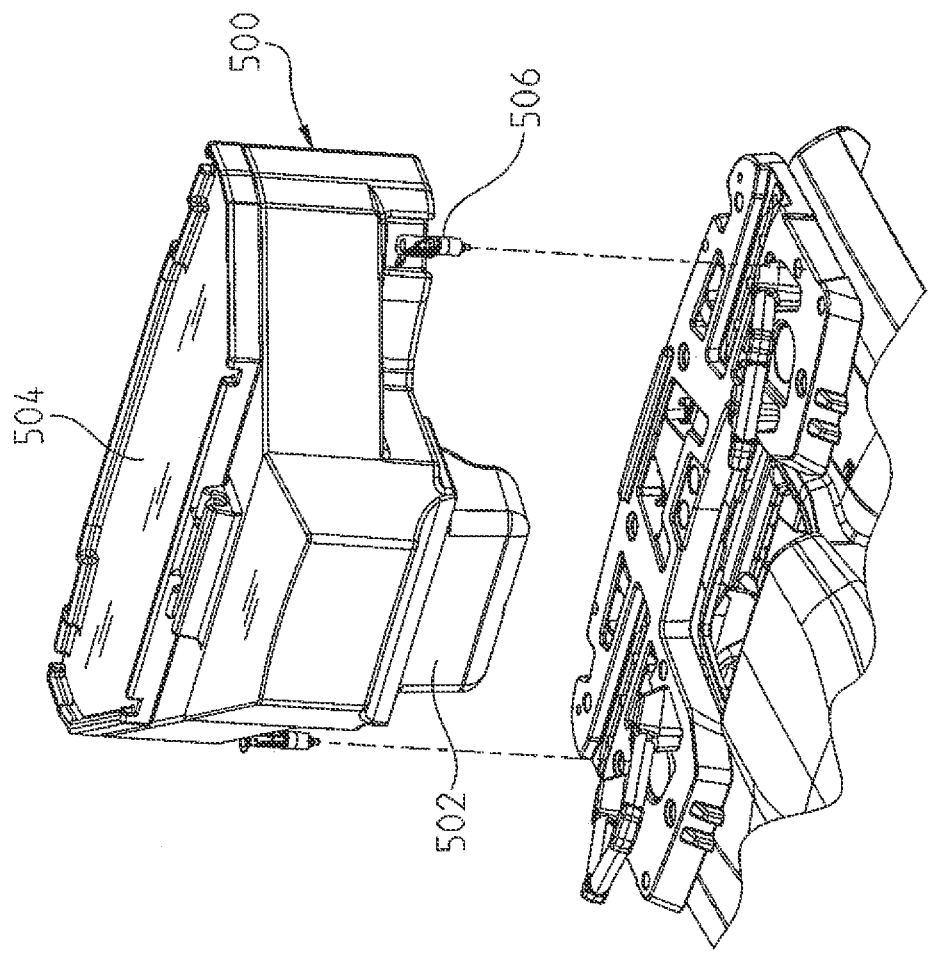

ATV HAVING ARRANGEMENT FOR A PASSENGER

CROSS-REFERENCE TO RELATED APPLICATIONS

The present application is a continuation of U.S. patent application Ser. No. 13/464,777, filed May 4, 2012, which is a divisional of U.S. patent application Ser. No. 12/012,587, filed Feb. 4, 2008, the complete disclosures of which are expressly incorporated by reference herein.

FIELD OF THE INVENTION

The present disclosure relates to all-terrain vehicles (ATVs) and more specifically, to arrangements for use by a passenger on an ATV.

BACKGROUND AND SUMMARY

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, and cargo hauling have entered the market place. Most ATVs include an engine including between one and three cylinders. Most ATVs include a straddle or saddle type seat positioned above the engine. Seating systems for supporting people in a seated position on such vehicles, for example, on ATVs, are well-known. Most systems generally involve a straddle type seat being secured to a frame structure.

Conventional straddle type seats on recreational and utility vehicles generally hold a number of people, and most commonly, the seats function in supporting one or two persons. In one example, a two-person seating system is designed with an elongated bench portion of the straddle type seat so as to support one person in front of the other. In another example, discrete seats bottoms are provided for supporting one person in front of the other, with the passenger elevated in relation to the driver.

It is desirable on ATVs to provide the most comfortable and ergonomically pleasing ride for either one or two ATV riders. Embodiments of the invention can be used to generally overcome the above shortcomings as well as others.

According to an illustrative embodiment of the present disclosure, an all-terrain vehicle comprises a plurality of ground-engaging members and a frame supported by the plurality of ground-engaging members and has a front end and a rear end. The all-terrain vehicle further comprises a straddle seat coupled to the frame and an attachment rack supported by the frame. The attachment rack has a first portion which defines an outer surface of the attachment rack and is comprised of a first material and a second portion which is positioned at least partially inward of the first portion and is comprised of a second material.

In another embodiment of the present disclosure, an all-terrain vehicle comprises a plurality of ground-engaging members, a frame supported by the plurality of ground-engaging members and extending along a longitudinal axis, and a straddle seat coupled to the frame. The all-terrain vehicle further comprises an attachment rack supported by the frame. The attachment rack has a polymeric surface and at least one metallic member coupled to the attachment rack. The at least one metallic member extends within at least one opening in the polymeric surface.

In a further embodiment of the present disclosure, an attachment rack for an all-terrain vehicle comprises an internal metallic portion, an external polymeric portion, and at least one mounting portion configured to support at least one of an accessory and cargo on the attachment rack.

BRIEF DESCRIPTION OF THE DRAWINGS

FIG. 18 shows an accessory trunk usable in lieu of the passenger seat.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, motorcycles, watercraft, utility vehicles, scooters, golf carts, and mopeds.

Figure 1:
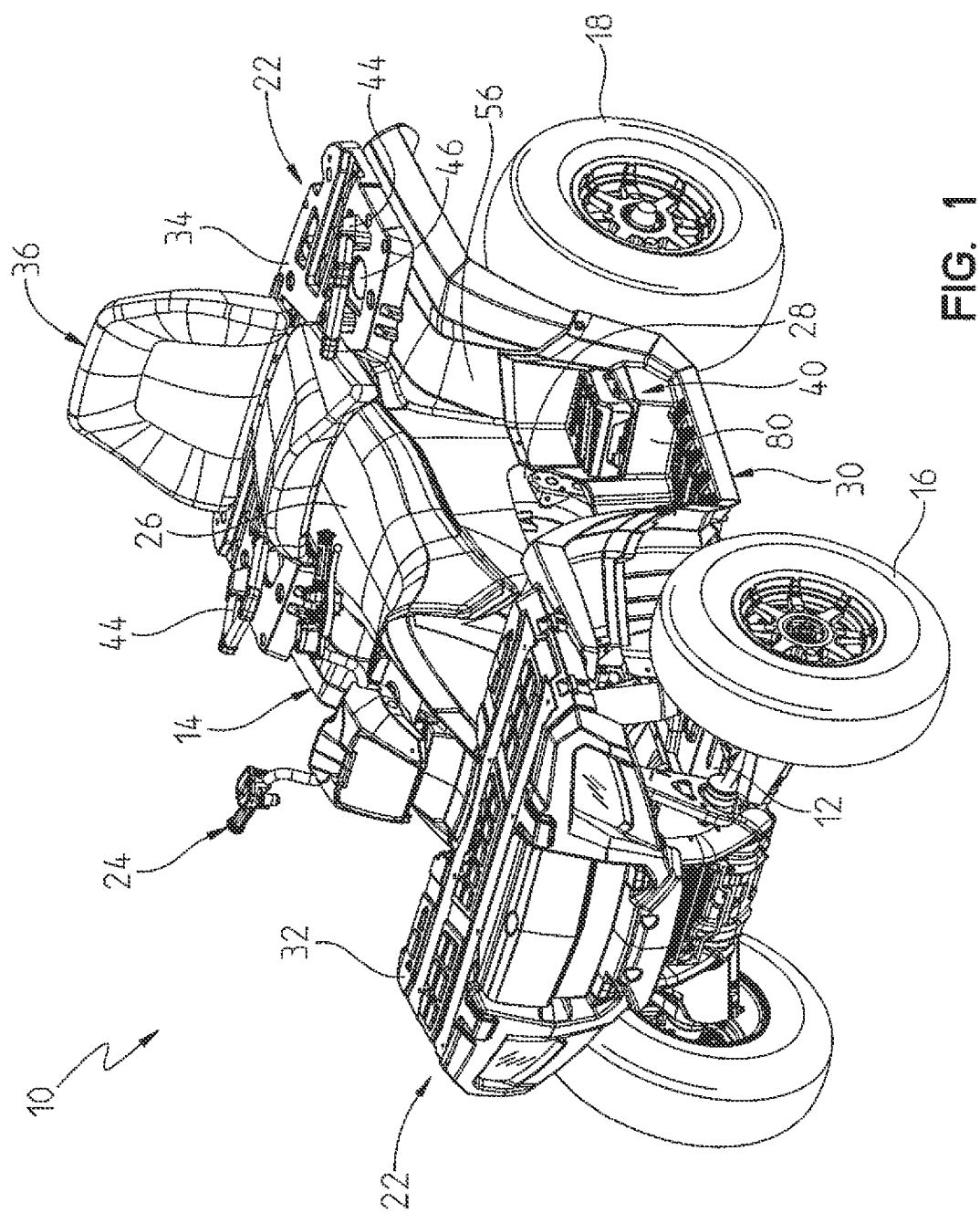
FIG. 1 is a front perspective view of vehicle described.
Figure 2:
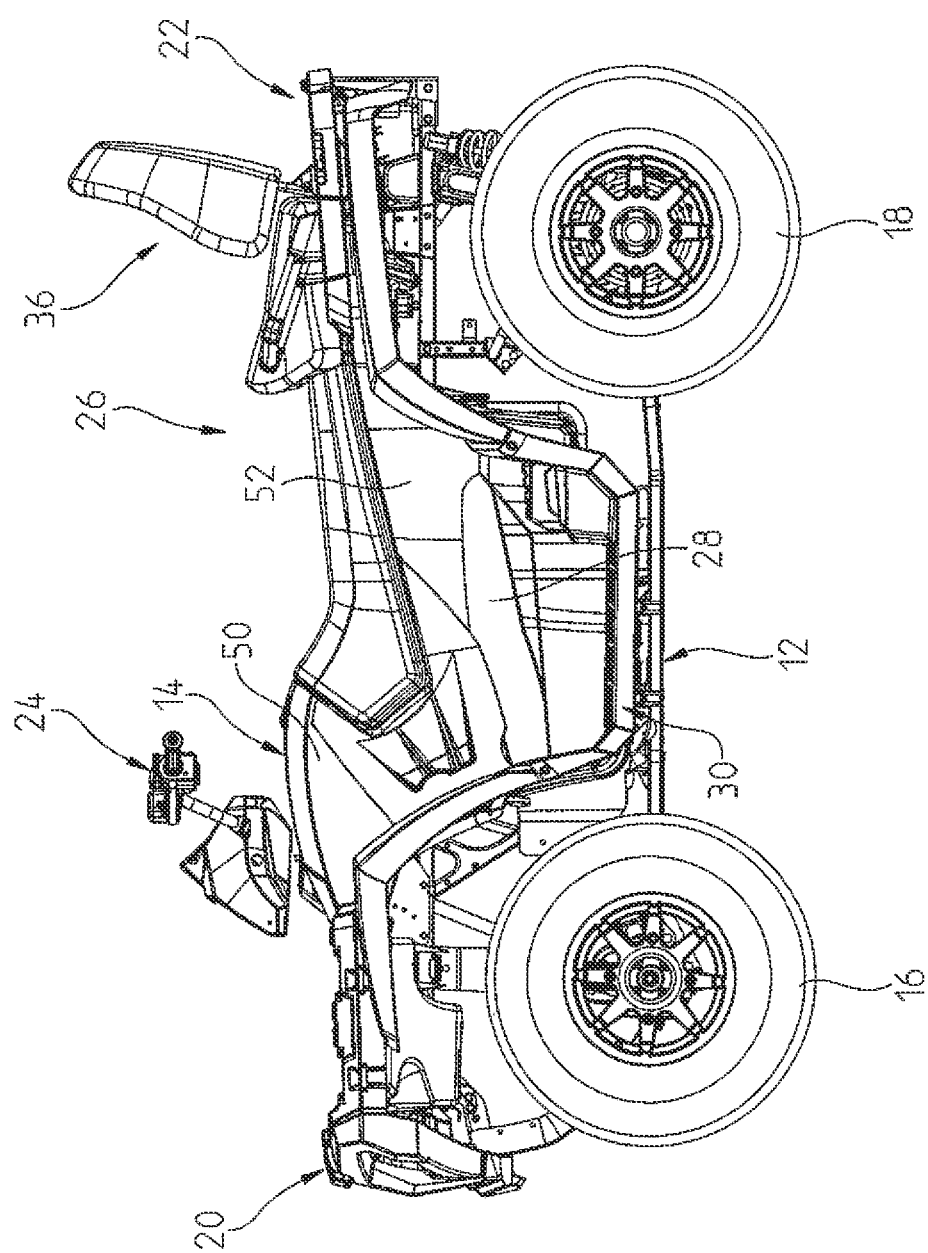
FIG. 2 is a left side plan view of the vehicle of FIG. 1.

Referring initially to FIGS. 1 and 2, one illustrative embodiment of an all terrain vehicle (ATV) 10 is shown. ATV 10 includes a frame 12, a chassis 14 mounted on the frame 12, where the frame 12 is supported by front and rear tires 16, 18, respectively. ATV 10 also includes a front end 20 and a rear end 22. Front end 20 and rear end 22 are separated by handlebar assembly 24, straddle-type seat 26, drive-train 28, and foot-wells 30. Foot-wells 30 are located on both lateral sides of ATV 10, and flank the straddle-type seat 26. Front end 20 also includes front accessory panel 32 which may include a tool storage compartment. Handlebar assembly 24 is operably coupled to front wheels 16 to allow a rider to steer ATV 10 when supported by straddle-type seat 26. Rear end 22 also includes rear accessory panel 34 which may also include a tool storage compartment. Front panel 32 and rear panel 34 may also include an accessory coupling system such as the one disclosed in U.S. Pat. No. 7,055,454, the disclosure of which is expressly incorporated by reference herein. Positioned rearward of the straddle type seat 26 is an auxiliary passenger seat 36, which as described herein, is selectively removable from the ATV 10.

Figure 3:
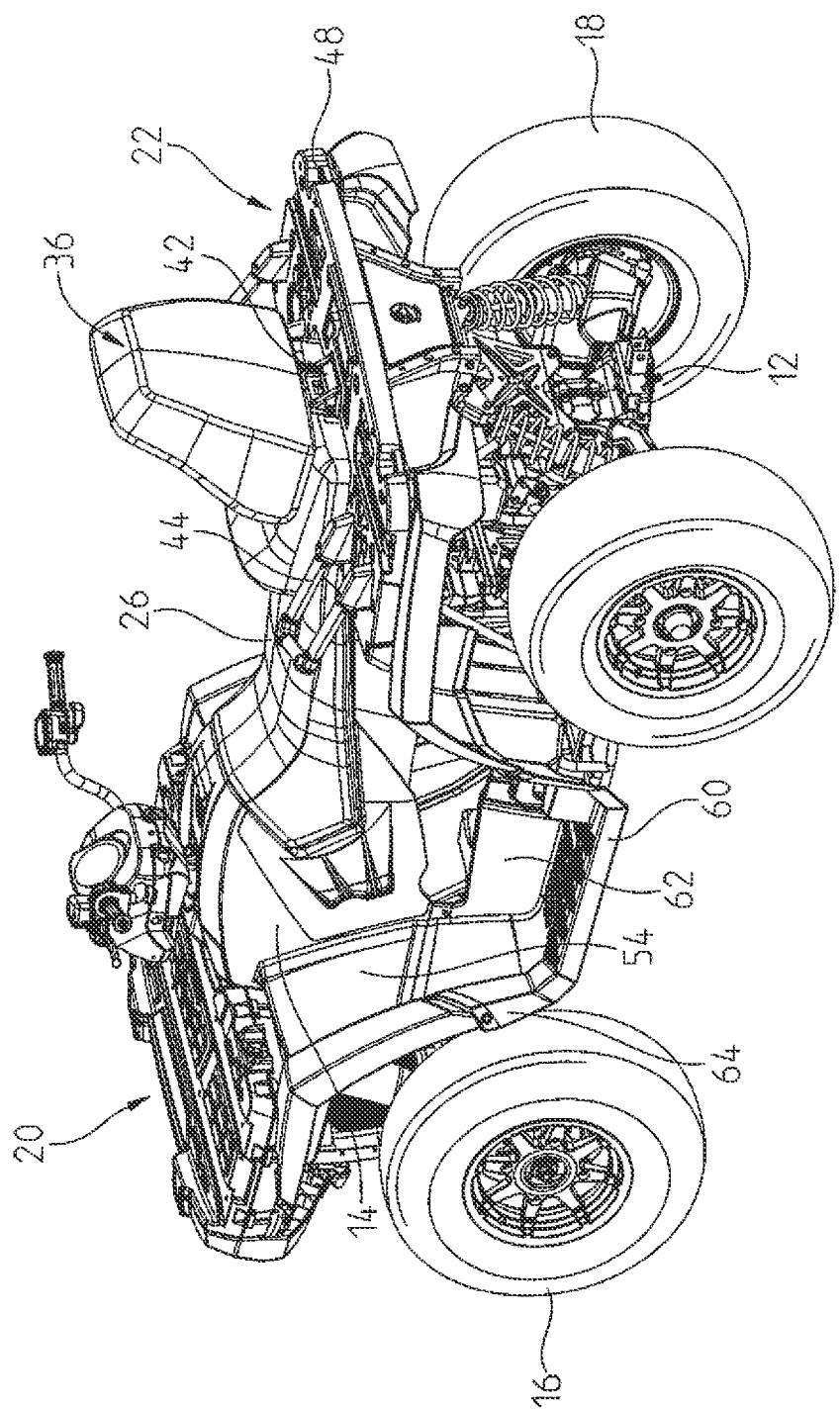
FIG. 3 is a rear perspective view of the vehicle of FIGS. 1 and 2.

ATV 10 incorporates many features or accessories which are useful to a passenger or driver of the ATV. First, the ATV 10 includes a pedestal assembly 40 incorporated into the foot-wells 30, which cooperate with removable passenger seat 36. Furthermore, passenger seat 36 is selectively added or removed from ATV 10 by way of a latch assembly 42. Hand grips 44 flank the removable seat and are attached to the rear accessory panel 34. The rear accessory panel also includes an integrated cup holder 46 (FIG. 6), and rack tie-downs 48 (FIG. 3). With the above generally described vehicle, other features will be introduced and more fully described below.

Figure 4:
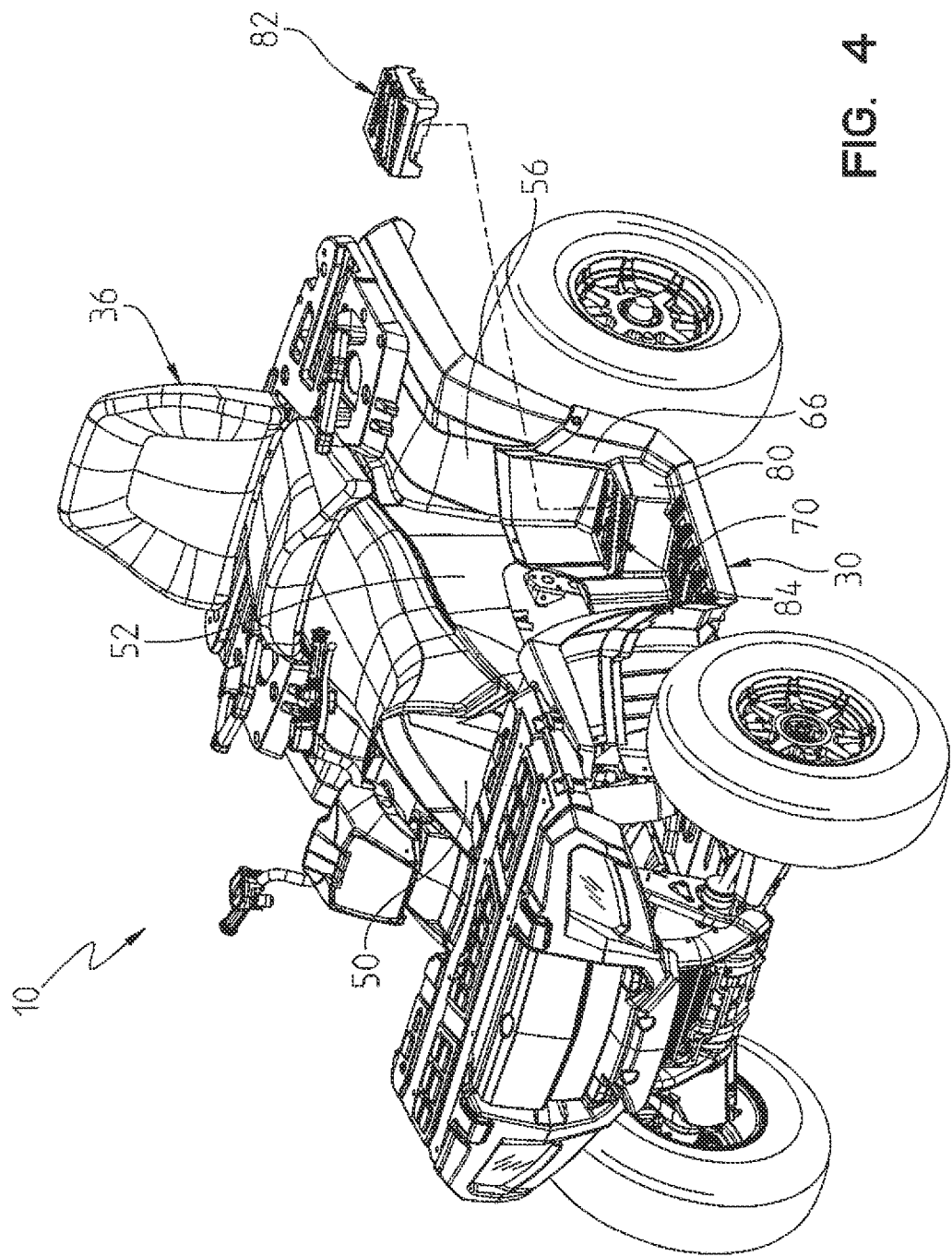
FIG. 4 is a view similar to that of FIG. 1 showing the pedestals removed.

With respect to FIGS. 1-3, the pedestal assembly 40 will be described. As shown, foot-wells 30 conform to the general shape of the chassis 14. Chassis 14 is provided with a shroud portion 50 (FIG. 2), a side panel 52 (FIGS. 2 and 4) beneath the straddle-type seat 26, front fenders 54 (FIG. 3), and rear fenders 56 (FIG. 4). Meanwhile, foot-wells 30 include a horizontal platform portion 60 (FIG. 3), a side panel portion (FIG. 3), a forward riser 64 (FIG. 3) which conforms with the front fender 54, and a rear riser 66 (FIG. 4) which conforms to the rear fender 56. As shown in any of the FIGS. 1-4, platform portion 60 includes a tread surface 70 for receiving the feet of the driver when seated on the straddle-type seat. As shown best in FIG. 1, pedestal assembly 40 is comprised of a fixed pedestal portion 80 and a removable pedestal portion 82 (FIG. 4). As best shown in FIG. 4, pedestal portion 80 includes an upper tread surface 84.

Figure 5:
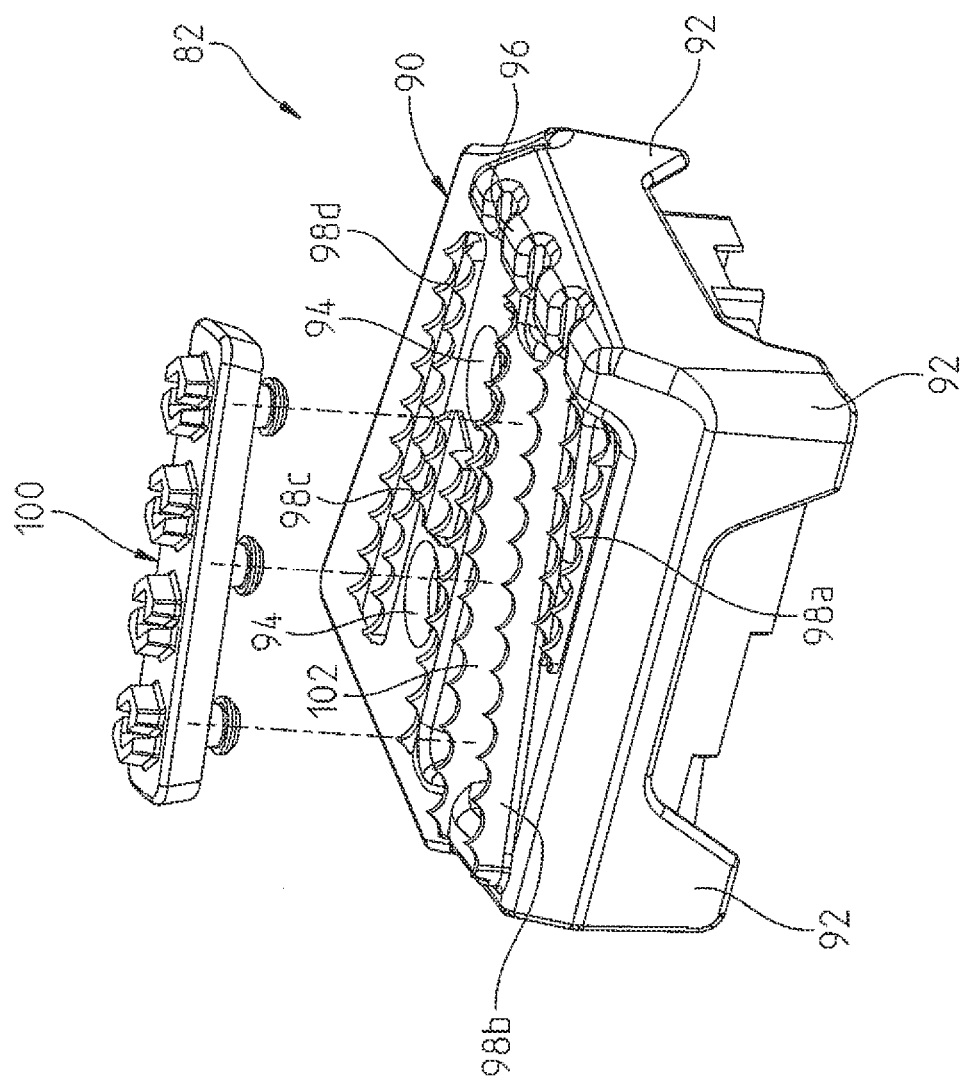
FIG. 5 is an enlarged view of the pedestals of FIG. 4.

With respect now to FIG. 5, removable pedestal portion 82 is comprised of a unitary molded pedestal block 90 having corner pedestal portions 92 which are profiled for placement on upper tread surface 84 where fasteners (not shown) can be inserted through apertures 94 for connection of the pedestal block 90 to pedestal portion 80. Removable pedestal portion 82 further includes features to assist in keeping the rider's foot on the pedestal, namely, an outer ridge 96, and a plurality of gripping treads such as 98a, 98b, 98c and 98d. Furthermore, a removable and replaceable rubber insert 100 is insertable into a slot 102 in pedestal block 90 for gripping the shoe or boot of the rider.

The purpose and use of the removable pedestal portion 82 is twofold. First, it is anticipated that for any given chassis size, multiple passenger seats 36 could be used that have varying heights. As the height of the seat changes, the location and height of the passenger's foot also changes, thus requiring the additional pedestal. Thus, in the event the seat is, for example, co-planar with the straddle-type seat 26, the pedestal portion 82 may be removed and the passenger's foot would rest directly on upper tread surface 84; whereas when a higher seat is utilized, for example, passenger seat 36 shown herein, pedestal 82 is used and the passenger's foot is positioned on the multiple treads 98a-98d. Second, with multiple sizes of passengers, and particularly height, it would be best ergonomically to have multiple heights to allow for the different height or length of the passenger's legs. Thus, for a taller passenger, the removable pedestal portion 82 could be removed to lower the vertical positioning of the passenger's foot.

Figure 6:
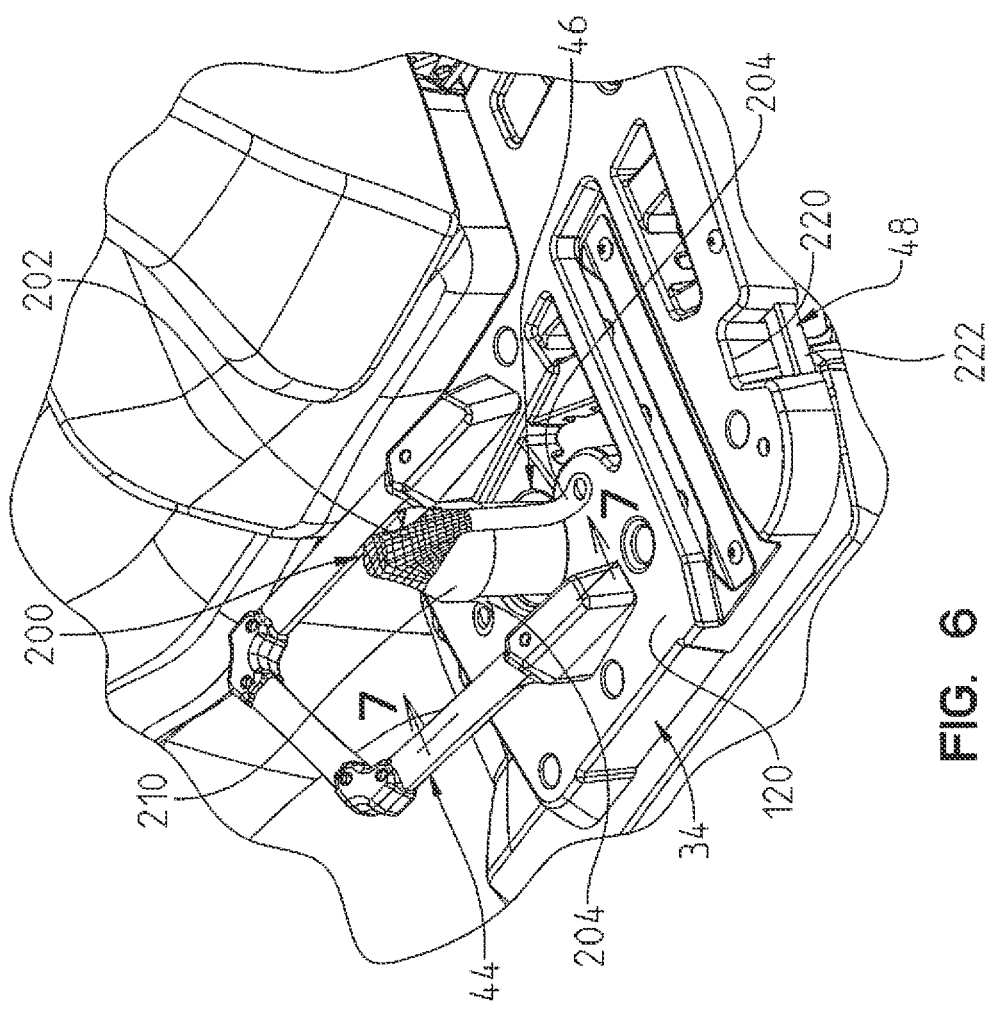
FIG. 6 is an enlarged view of the passenger hand grips.
Figure 7:
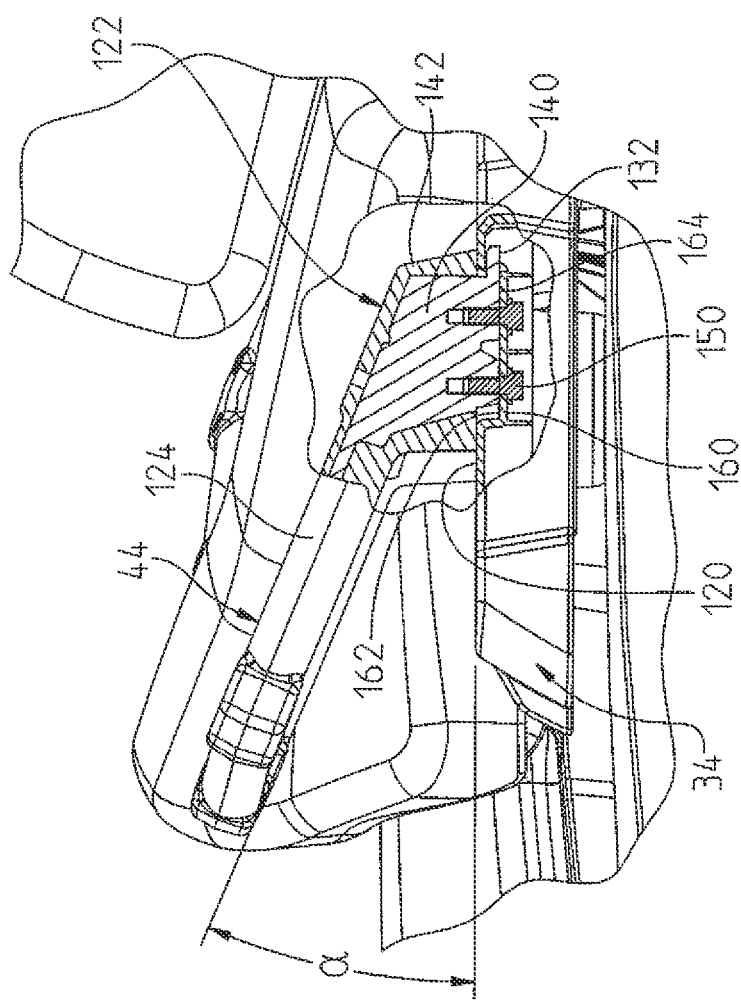
FIG. 7 is a cross-sectional view through lines 7-7 of FIG. 6.

With reference now to FIG. 6, hand grip 44 is shown in a position mounted to a top surface 120 of rear accessory panel 34. As shown best in FIGS. 6, 7 and 9, hand grips 44 include base members 122 having side hand grip bars 124 and 126 and end hand grip bars 128 connected by corner joining members 130. As shown best in FIGS. 7 and 9, base member 122 includes a mounting lip 132 adjacent to an end thereof for mounting purposes as described herein. As best shown in FIG. 7, base member 122 is comprised of a two component member having an internal rigidified section 140 and an overmolded portion 142. The rigidified section 140 could be comprised of any suitable structural material such as plastic or aluminum for example, whereas the overmolded material 142 would be a softer material such as a rubber-like overmolded material, for vibration resistance as will be described further herein. In the embodiment shown, cast aluminum is anticipated.

Figure 9:
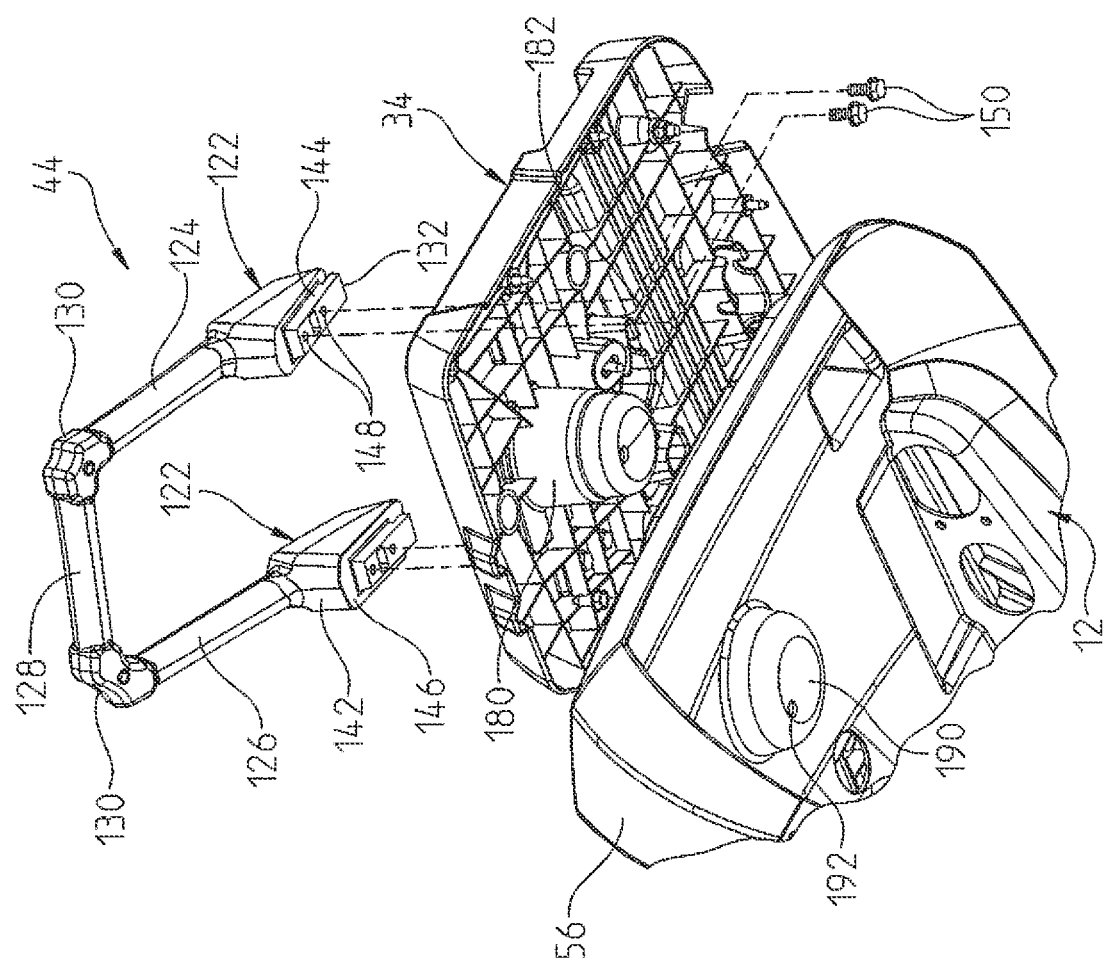
FIG. 9 is an exploded view looking upwardly at the disassembled hand grip and rear accessory panel.

With respect still to FIGS. 7 and 9, the base members 122, and particularly the internal rigidified section 140 is comprised of a mounting portion 144 which projects downwardly from the overmolded portion 142 to define a mounting shoulder 146 as described herein. Mounting portion 144 includes mounting apertures 148 profiled to receive fasteners 150. As shown best in FIG. 7, rear accessory panel 34 includes a mounting well 160 having a top mounting surface 162 and a rear slot opening 164 which is profiled at least as wide as mounting lip 132. It should be appreciated then that hand grips 44 are mounted to rear accessory panel 34 by first inserting mounting lip 132 through slot opening 164 in a manner such that hand grips 44 are then rotated counter-clockwise as viewed in FIG. 7 to a position where fasteners 150 may be inserted through a bottom of rear accessory panel 34 (see FIG. 9). When the fasteners 150 are fully tightened, as in the position of FIG. 7, a bottom surface of the mounting portion 144 (FIG. 9) is flush with top mounting surface 162 and the shoulder 146 (FIG. 9) is somewhat compressed against, top surface 120. It should be appreciated that the compression of the resilient overmolded portion 142 provides a vibration resistance against the vibration of the vehicle passing through to the passenger's hands, while gripping the hand grips 44.

Figure 8:
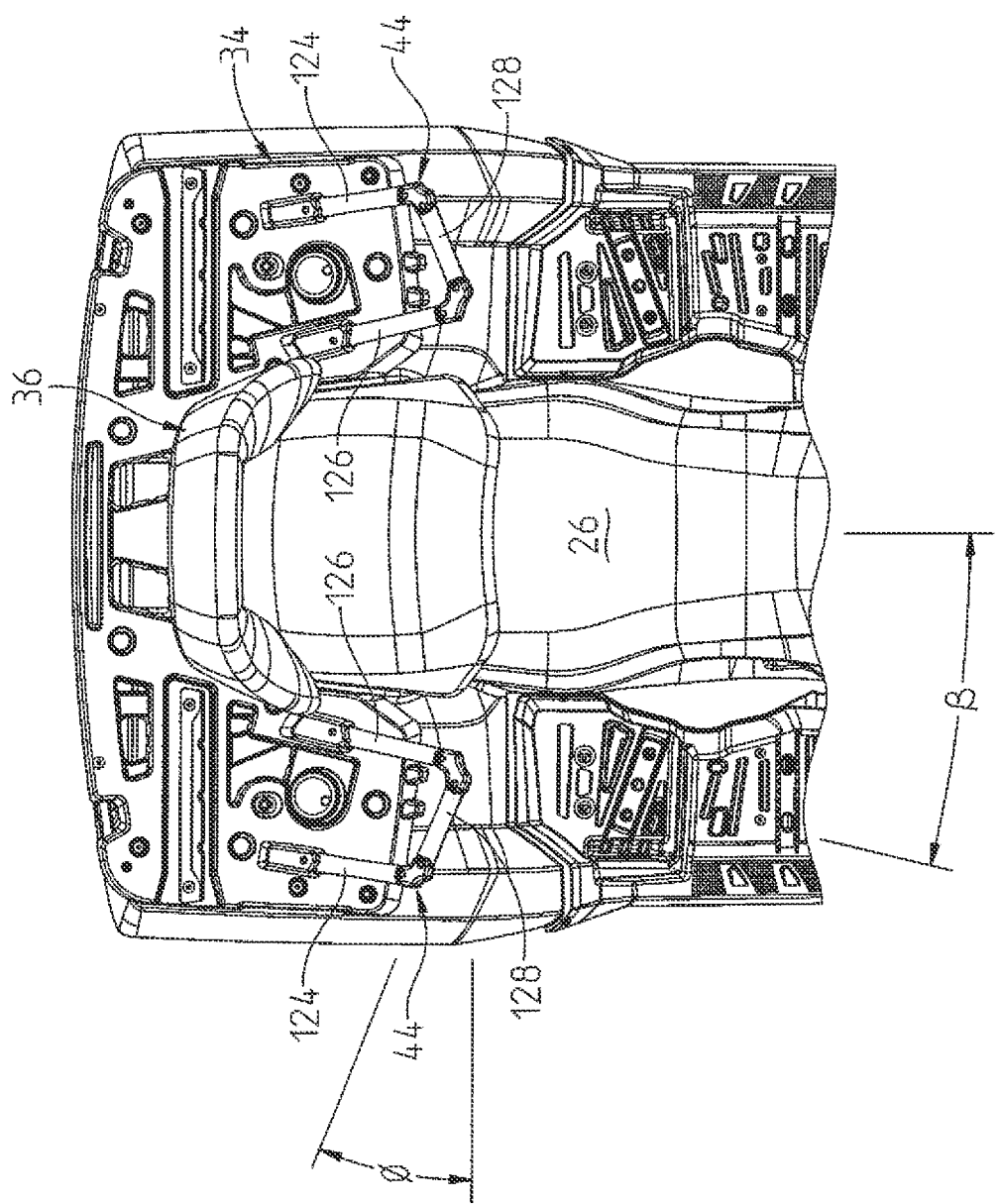
FIG. 8 is a partial top plan view showing the passenger seat and hand grip area.

As mounted, the hand grips 44, and particularly the side hand grip bars 124, 126, extend forwardly and upwardly by an angle $\alpha$ relative to a horizontal plane (see FIG. 7) and the side hand grip bars 124 and 126 extend forwardly and outwardly from the longitudinal axis by an angle $\beta$ as shown in FIG. 8. Meanwhile, the end hand grip bars 128 extend at an angle $\phi$ relative to transverse (see FIG. 8). By this configuration, a passenger has three separate positions for each hand for gripping, namely, either of the bars 124, 126 or 128, and thus the passenger may find the most ergonomically comfortable position for gripping. It is anticipated, however, that a passenger would hold the end hand grip bars 128, for example, when traversing rolling terrain where the passenger's body would the natural tendency to move in the vertical direction, whereas the passenger would more than likely have the tendency to grip either of the hand grip bars 124, 126, when traversing side to side terrain, when the passenger's body would have the natural tendency to move side-to-side.

Figure 10:
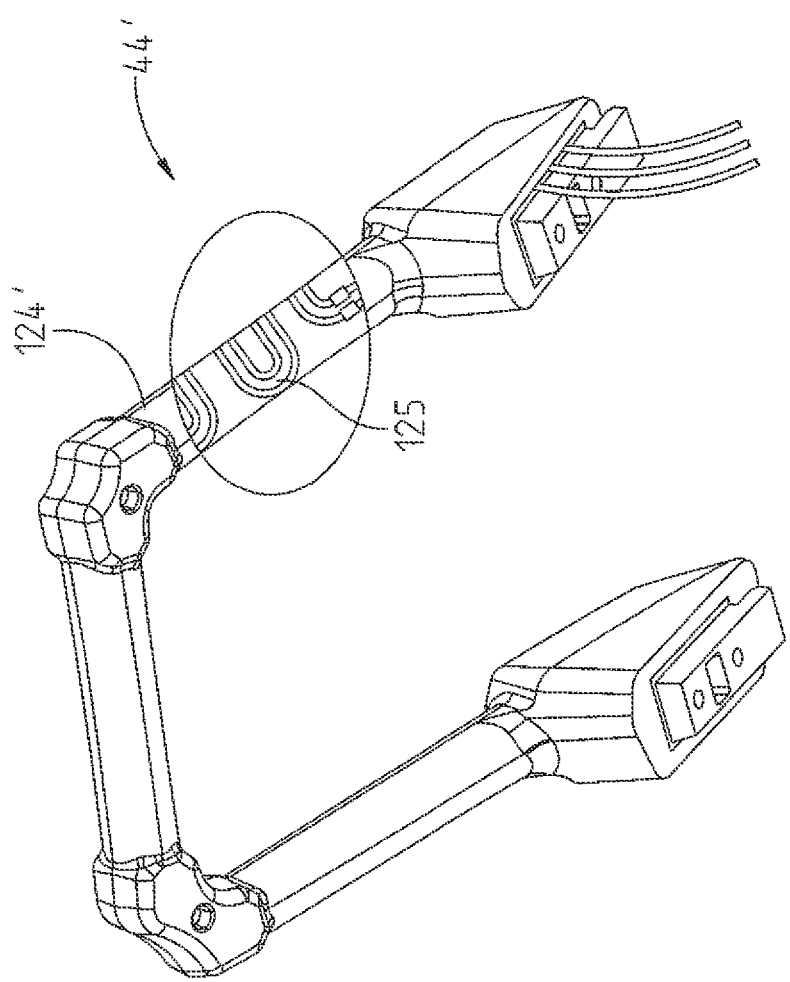
FIG. 10 shows an alternate hand grip.
Figure 11:
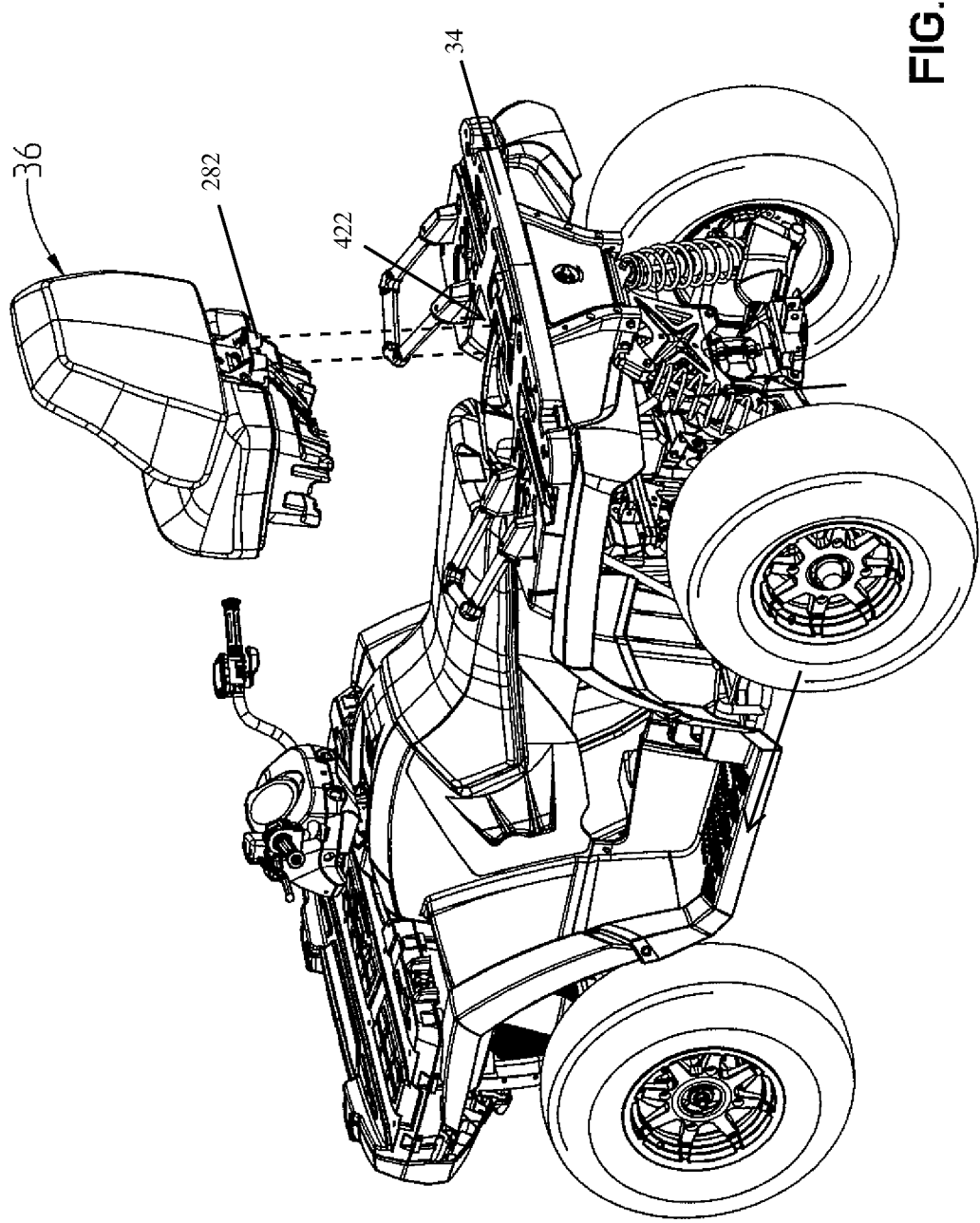
FIG. 11 shows the passenger seat exploded away from the vehicle.

FIG. 10 shows an alternate embodiment of the hand grip 44' where the side hand grip bars 124' include integrated heating elements such as 125 for selectively warming the side hand grip bars 124' and resultantly the passenger's hands.

With reference now to FIGS. 6 and 9, the integrated cup holder 46 will be described in greater detail. As shown best in FIG. 6, cup holder 46 is shown located directly between the hand grip 44, which is chosen due to a convenient location for the passenger's hands, although it should be appreciated that this cup holder could be positioned anywhere on the rear accessory panel 34, and, for example, anywhere on the vehicle itself. However in this particular embodiment, the cup holder is shown directly integrated with the rear accessory panel 34.

As shown best in FIG. 9, rear accessory panel 34 is shown from an underside, where it can be seen that the rear accessory panel is comprised of a one piece molded construction where a cup holder well 180 projects downwardly from top surface 120 of the rear accessory panel 34. Well 180 includes a drain hole 182 integrally formed therein. As mentioned above, rear accessory panel 34 is mounted on top of the rear fenders 56, and in the embodiment of FIG. 9, rear fenders 56 are mounted on top of a rear portion of frame 12. As shown, rear fender 56 includes a complementary well 190, which is profiled to receive well 180 and well 190 includes a drain hole 192 therethrough. As shown in FIG. 9, while the wells 180, 190 are positioned in a substantially coaxial position, the drain holes 182 and 192 are intentionally misaligned, that is, they are each located on opposite sides of the same transverse axis, to prevent rocks or dirt from the underside of rear fender 56 from projecting through to the passenger through drain hole 182, yet fluid may drain through the drain holes 182, 192.

With respect now to FIG. 6, a retaining assembly 200 is provided, attached to the rear accessory panel 34 and includes netting 202 held by straps 204 to the top surface 120 of rear accessory panel 34 by way of fasteners. It should be appreciated that either or both of the netting 202 and straps 204 could be elastic such that bottle 210 is held with a downward force within the cup holder 46.

With respect again to FIG. 6, rack tie-downs 48 will be described in greater detail. As with most ATVs or utility vehicles, it is often times necessary to use a rope or bungee cord to retain articles to the top surface of the rear accessory panel, for example, tool boxes or other items used in hunting, fishing, camping or farming. For this purpose, integrated rack tie-downs 48 are included where the plastic of the rear accessory panel 34 is molded to include an opening at 220 to expose a length of an internal structural rib or frame 222 such as a metal rod or tube piece. This tube piece 222 could be a peripheral frame piece or could be separate segments located along the length or periphery, or located anywhere along the internal area of panel 34. It should also be appreciated that tie-downs 48 could also be incorporated into front panel 32.

Figure 12:
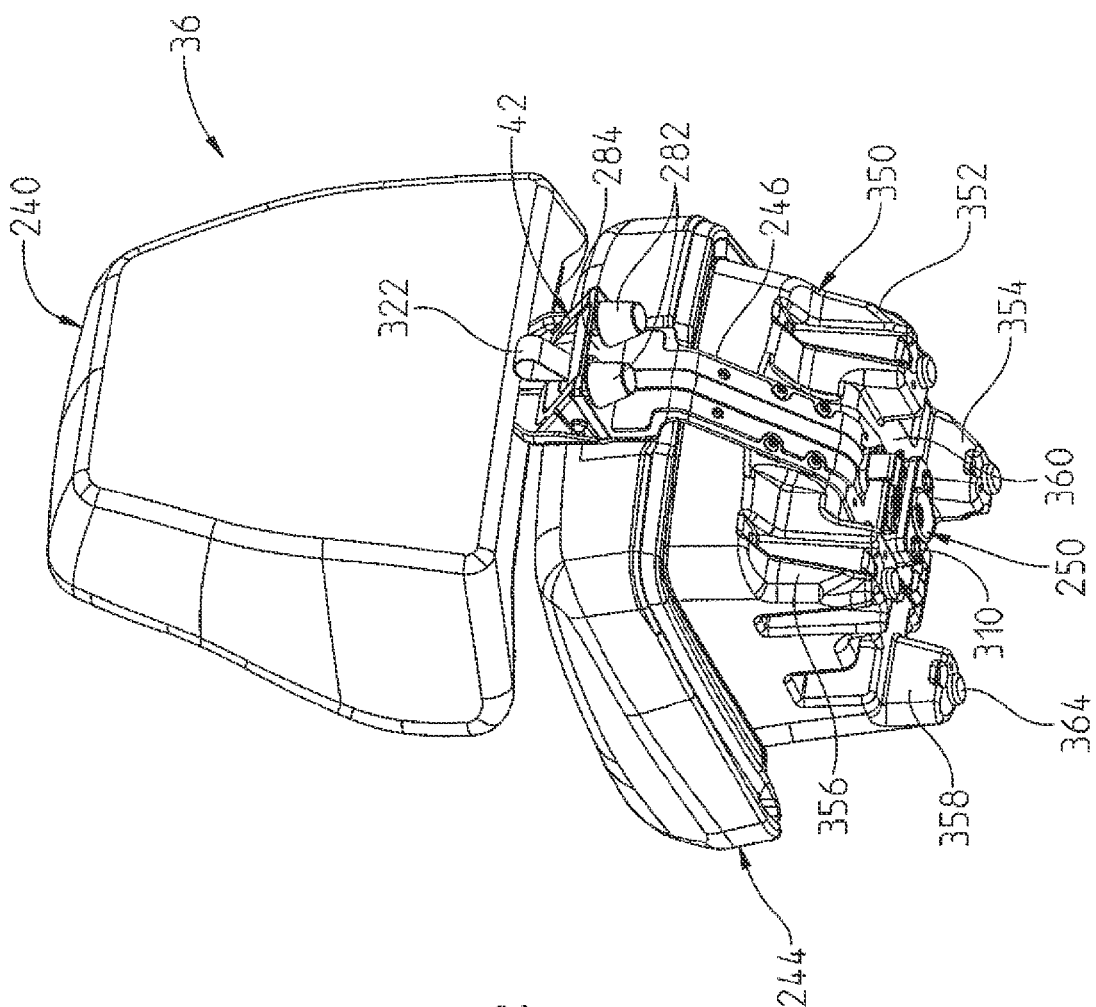
FIG. 12 shows an enlarged view of the passenger seat of FIG. 11.
Figure 13:
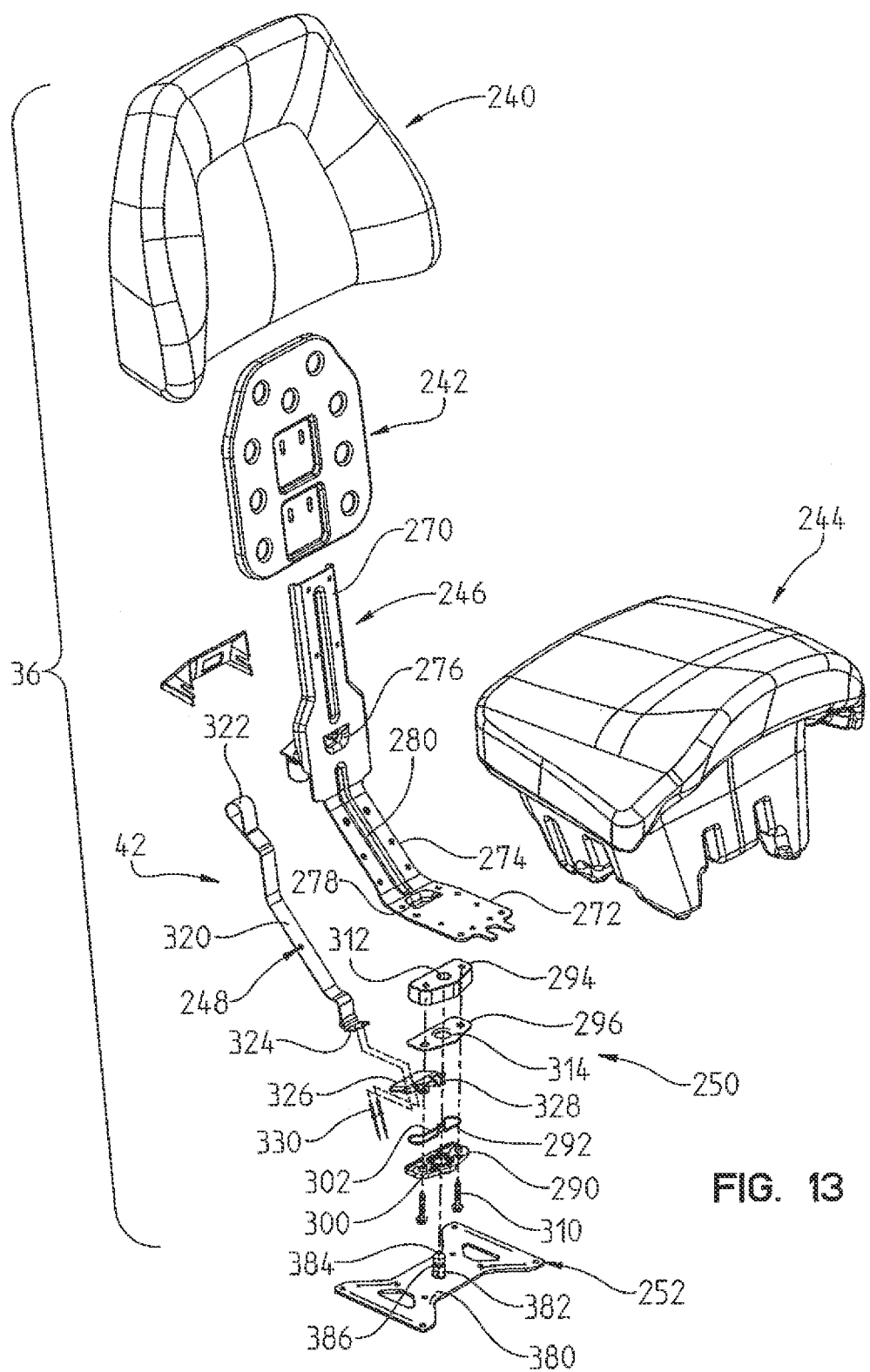
FIG. 13 shows an exploded view of the entire passenger seat assembly.

With reference now to FIGS. 11-14, the passenger's seat 36 will be described in greater detail. With reference first to FIGS. 12 and 13, passenger seat 36 includes seat back 240, seat back frame 242, seat bottom 244, seat frame 246, latch lanyard 248, and spring latch assembly 250. A latch base plate 252 is mounted within the vehicle as will be described herein.

With respect first to FIG. 13, seat frame 246 includes a seat back frame portion 270, a seat bottom frame portion 272 and a transition portion 274 extending therebetween. Seat back frame portion 270 includes an aperture therethrough at 276, while seat bottom frame portion 272 includes an aperture at 278. An embossed channel 280 extends between the apertures 276 and 278 and extends generally along the transition section 274 as shown. As shown best in FIG. 12, rubber isolation mounts 282 extend from a bracket 284 mounted on the back side of seat frame 246.

With reference still to FIG. 13, spring latch assembly 250 includes a receiver plate 290, spring 292, spring block 294 and back up plate 296. Receiver plate 290 includes a pin receiving aperture 300 and spring 292 includes a spring portion 302 overlapping aperture 300. Thus as shown, receiver plate 290, spring 292, block 294 and back up plate 296 stack together and may be fastened to frame portion 272 by way of fasteners 310. Block 294 and back up plate 296 also include throughholes 312, 314, respectively, which align with aperture 300 as described herein. With reference still to FIG. 13, lanyard 248 includes a strap 320 having a pull loop 322 at one end and a connection link 324 at the opposite end. Link 324 is connected to release member 326 having engagement members 328 as will be described herein. Link 324 and release member 326 are attached together by way of rivets 330.

With reference now to FIG. 12, seat bottom 244 includes a molded frame portion 350 comprised of corner pedestal portion 352, 354, 356 and 358, which define a central recess portion 360 for receiving spring latch assembly 250 as shown. Each of the pedestals 352-358 also include rubber isolation mounts 364. Thus as shown in FIG. 12, fasteners 310 are positioned through receiver plate 290 and with spring 292 positioned on the plate 290 fasteners can extend through the block 294, back up plate 296 and are attached to frame portion 272. It should be appreciated that release member 326 is moveably trapped between plate 290 and block 294. It should also be appreciated that strap 320 is laced through apertures 278 to lie within channel 280 and exits through aperture 276 to position loop 322 on the backside of seat 36 as shown in FIG. 12. As also shown in FIG. 12, latch assembly 250 is mounted within the recessed portion 360 and seat frame 246 is fastened to seat bottom frame 350 and seat back frame 242 to hold the entire assembly together.

Figure 14:
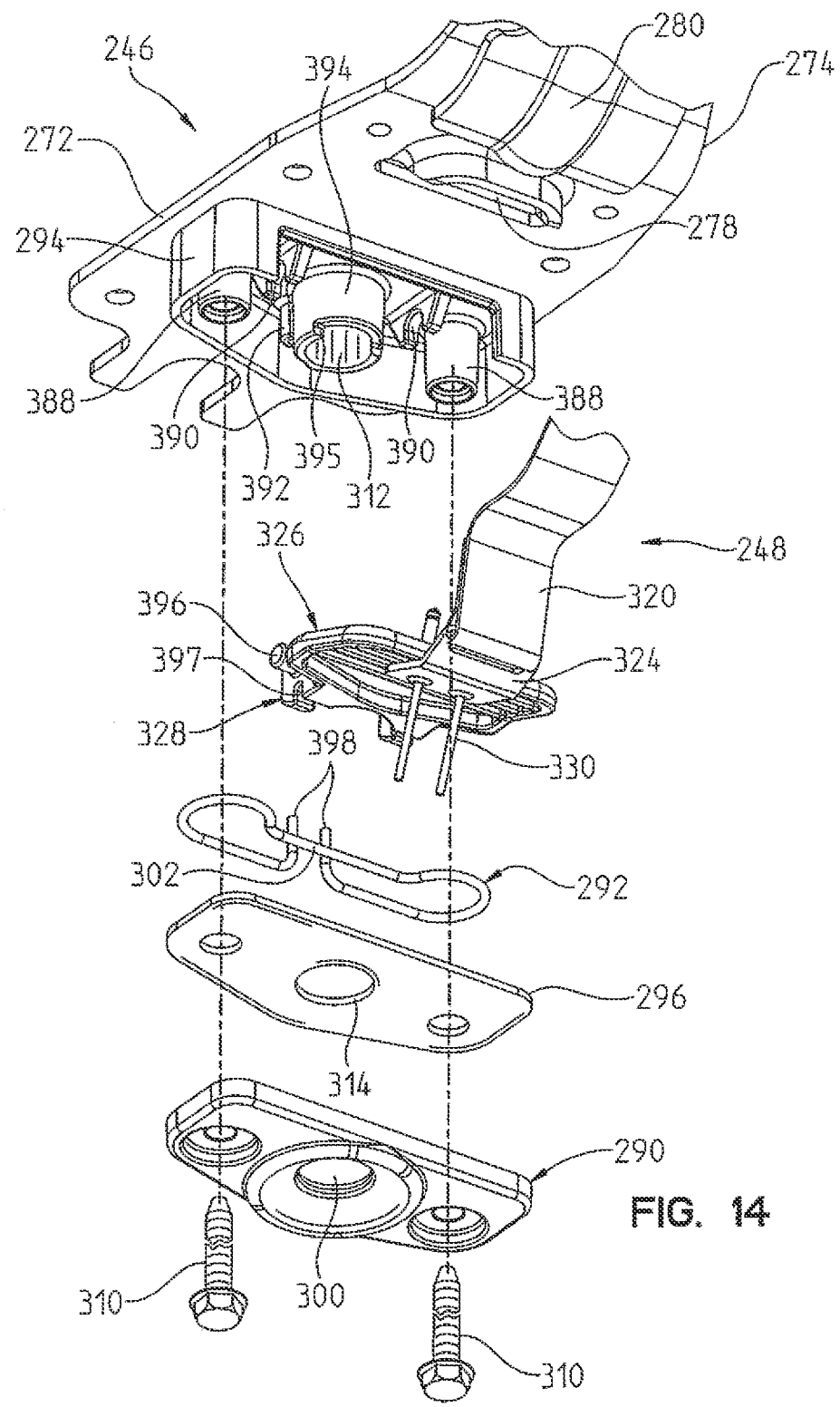
FIG. 14 shows an underside perspective view of a portion of the passenger seat assembly of FIG. 13.

With reference still to FIG. 13, latch base plate 252 includes mounting plate 380 having a mounting pin 382 upstanding therefrom having a tapered end 384 and a groove 386. With reference now to FIG. 14, block 294 includes threaded bosses 388 profiled to threadably receive fasteners 310. Block 294 further includes U-shaped channels 390, posts 392, and a central post 394 which forms opening 312, and where post 394 is formed with a cut-away portion 395. As also shown in FIG. 14, release member 326 includes trunnions 396 on each side thereof, and are profiled for receipt within the U-shaped channels 390. The engagement members 328 include gripping channels 397. Finally, spring 292 includes clip ends 398.

The spring latch assembly 250 is assembled as follows: Strap 320 and link 324 are first attached to release member 326 by way of rivets 330. Trunnions 396 are then positioned in U-shaped channels 390. Spring 292 is positioned with spring portion 302 positioned in cutaway 395 and in gripping channels 397, and with clip ends 398 positioned in apertures of posts 392. Receiver plate 290 and back-up plate 296 are then positioned over threaded bosses 388, and fasteners 310 may be threadably received therein, to retain the assembly in place.

Figure 15:
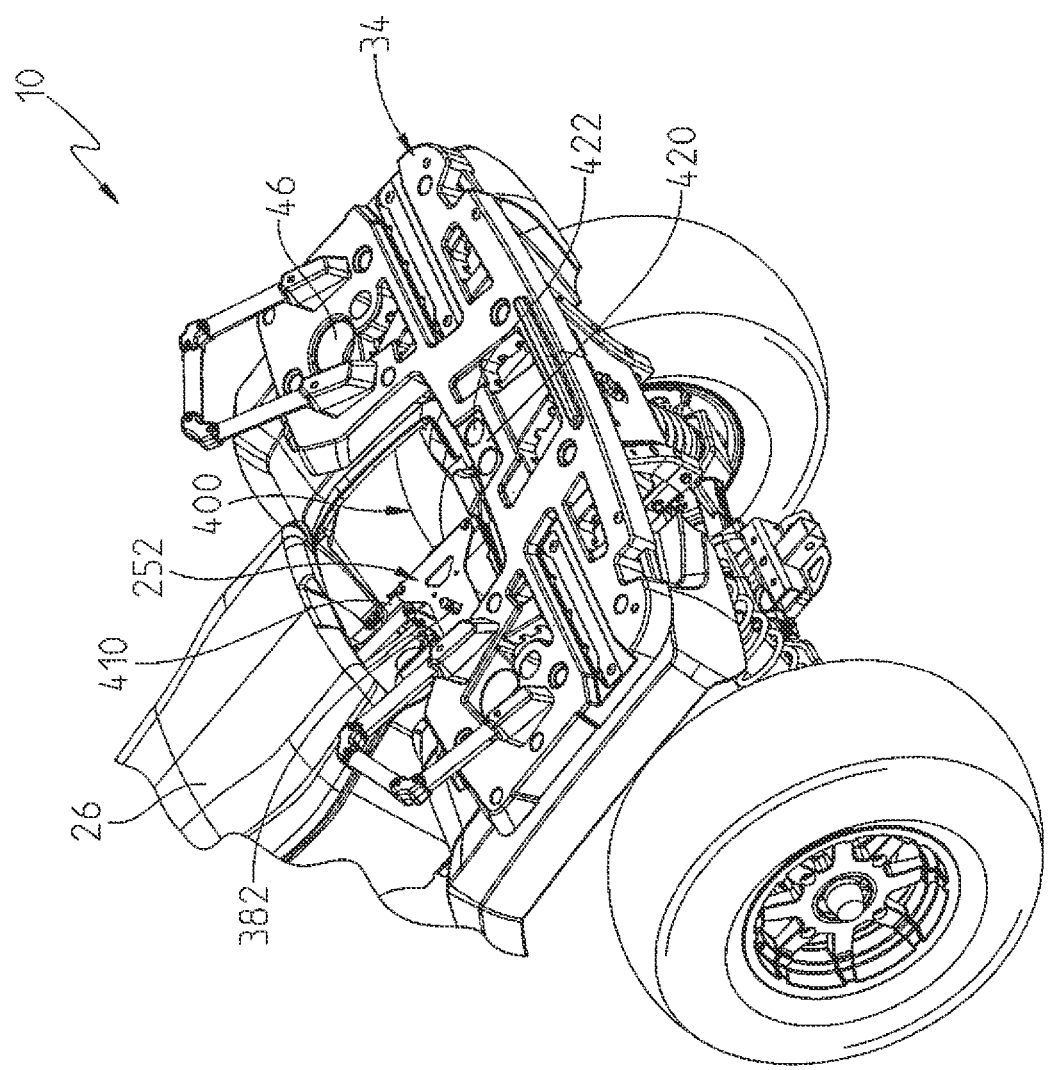
FIG. 15 shows an enlarged view of the receiving area of the vehicle for receiving the passenger seat.

With reference now to FIG. 15, vehicle 10 is shown where vehicle includes an opening 400, intermediate rear fenders, behind straddle-type seat 26, and through the chassis. Base plate 252 is shown mounted directly to longitudinally extending frame portions 410 of frame 12. Pin 382 is also shown poised for receipt for locking with the spring latch assembly 250. Finally, rear accessory panel 34 includes a receiving area 420 having receiving openings 422 profiled to receive isolation mounts 282 (FIG. 12). As such, isolation mounts 282 are configured to contact rear accessory panel 34.

Figure 16:
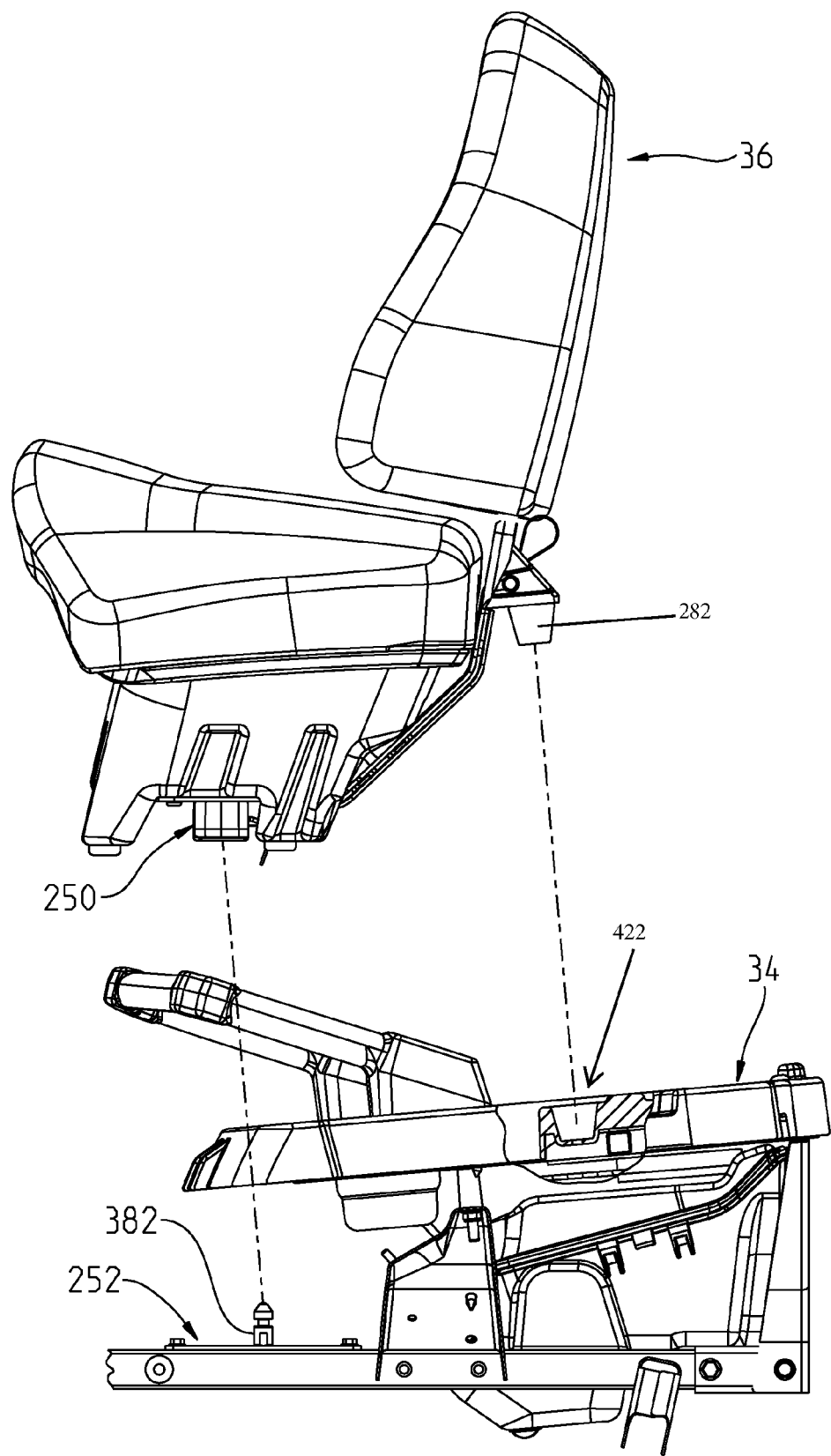
FIG. 16 shows a side view of the seat and vehicle with the chassis removed.
Figure 17:
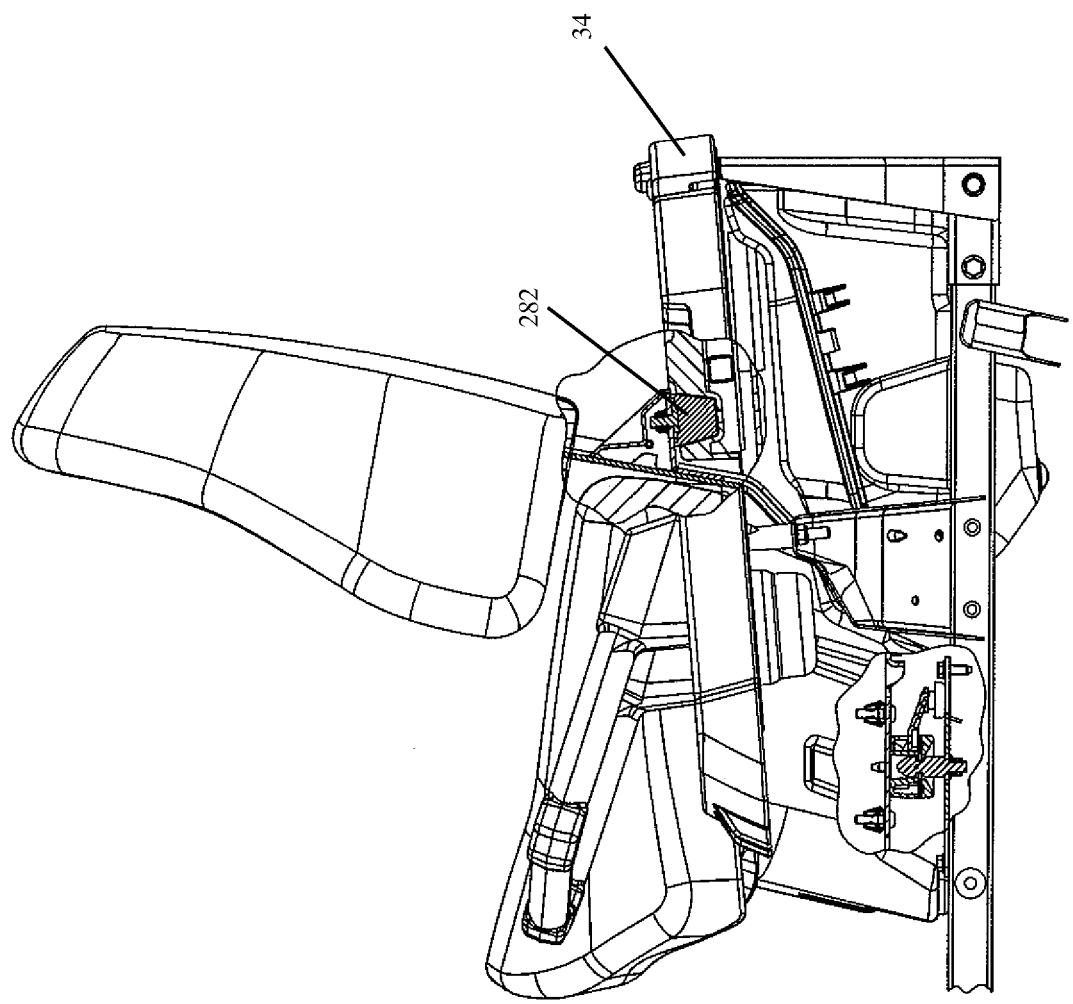
FIG. 17 is a view similar to that of FIG. 15 showing the seat in a latched position.

Thus as described, seat 36 is attached to vehicle 10 by positioning seat frame 350 within opening 400 such that pin 382 aligns with opening 300 (FIG. 13) in receiving plate 290, as shown in FIGS. 15-17. It should be appreciated that when pin 382 is aligned with opening 300, spring portion 302 resiles into pin groove 386 to retain the seat assembly in position. When the seat needs to be removed, loop 322 of strap 320 is pulled which causes release plate 326 to rotate about trunnions 396. Gripping channels grip spring portion 302 and disengage spring 292 from pin 382, which allows the seat to pull straight out of opening 400. It should be noted that the movable portion of the latch assembly 42, that is release member 326 and spring 292, are movably attached to the seat. It should also be noted that lanyard strap 320 is pulled generally vertically to release the latch assembly 42 from the pin 382. Therefore, the directional component of the force on the lanyard 248 assists in the removal of the passenger seat 46. As mentioned above, isolation mounts 282 are positioned in receiving openings 422 which provides for vibration dampening between the frame of the vehicle and the frame of the passenger seat.

Finally, and with reference to FIG. 18, an auxiliary trunk 500 is also usable, in lieu of the passenger seat 36 where the trunk 500 includes a frame portion 502 which is configured in a similar manner to frame 350 and would snap latch to pin 382 in a like manner. In addition, latch members such as 506 could be incorporated which are referred to as Applicants' "LOCK-N-RIDE", and which are shown and described in Applicants' U.S. Pat. No. 7,222,582, the disclosure of which is incorporated herein by reference.

What is claimed is:

1. An all-terrain vehicle, comprising:
a plurality of ground-engaging members;
a frame supported by the plurality of ground-engaging members and having a front end and a rear end;
an operator seat coupled to the frame; and
an attachment rack supported by the frame, the attachment rack having a first portion defining an outer surface of the attachment rack and comprised of a first material and a second portion positioned at least partially inward of the first portion and comprised of a second material, wherein the first portion has a width extending from a right side of the vehicle to a left side of the vehicle and includes at least one opening and the second portion is exposed within the at least one opening, and the first portion is directly coupled to a body panel of the vehicle and is directly coupled to the second portion, and wherein the entirety of the attachment rack is positioned longitudinally rearward of a forward end of the operator seat.

2. The vehicle of claim 1, wherein the first and second portions are configured to support at least one accessory.

3. The vehicle of claim 1, wherein the second portion is coupled to the first portion.

4. The vehicle of claim 3, wherein the second portion is integral with the first portion.

5. The vehicle of claim 1, wherein the first material is a polymeric material and the second material is a metallic material.

6. The vehicle of claim 1, wherein the second portion defines a tie-down member of the attachment rack.

7. The vehicle of claim 1, wherein the second portion at least partially defines a vertically inner surface of the attachment rack.

8. The vehicle of claim 1, wherein the attachment rack is supported on at least one of the front end and the rear end of the frame.

9. An all-terrain vehicle, comprising:
a plurality of ground-engaging members;
a frame supported by the plurality of ground-engaging members and extending along a longitudinal axis;
an operator seat coupled to the frame; and
an attachment rack supported by the frame, the attachment rack having a polymeric portion and at least one metallic member coupled to the attachment rack and extending within at least one opening in the polymeric portion, and the polymeric portion is directly coupled to a body panel of the vehicle and is directly coupled to the at least one metallic member, and wherein the attachment rack has a first portion positioned longitudinally rearward of a rear end of the operator seat and a second portion extending longitudinally forward from the first portion and positioned laterally adjacent the rear end of the operator seat, and wherein the entirety of the attachment rack is positioned longitudinally rearward of a forward end of the operator seat.

10. An all-terrain vehicle, comprising:
a plurality of ground-engaging members;
a frame supported by the plurality of ground-engaging members and extending along a longitudinal axis;
an operator seat coupled to the frame; and
an attachment rack supported by the frame, the attachment rack having a polymeric surface and at least one metallic member coupled to the attachment rack and extending within at least one opening in the polymeric surface, and wherein the attachment rack has a first portion positioned longitudinally rearward of a rear end of the operator seat and a second portion extending longitudinally forward from the first portion and positioned laterally adjacent the rear end of the operator seat.

11. The vehicle of claim 10, further comprising a plurality of body panels coupled to the frame and the attachment rack is coupled to at least one of the plurality of body panels.

12. The vehicle of claim 11, wherein the at least one body panel has a width extending in a lateral direction perpendicular to the longitudinal axis, and the attachment rack has a width extending in a lateral direction perpendicular to the longitudinal axis, the width of the attachment rack being less than the width of the at least one body panel.

13. The vehicle of claim 10, wherein the attachment rack is positioned longitudinally rearward of the operator seat and the plurality of ground-engaging members includes at least one rear wheel, and a longitudinally rearward-most end of the attachment rack is positioned forward of a longitudinally rearward-most end of the rear wheel.

14. The vehicle of claim 10, wherein the metallic member is positioned vertically inward from the polymeric surface.

15. The vehicle of claim 10, wherein the attachment rack is configured to support an accessory vertically above the polymeric surface.

16. The vehicle of claim 10, wherein the at least one metallic member is positioned longitudinally rearward of the operator seat.

17. The vehicle of claim 10, wherein the at least one metallic member extends generally perpendicularly to the longitudinal axis.

18. The vehicle of claim 10, wherein the at least one metallic member has at least one of a generally circular cross-section and a generally rectangular cross-section.

* * * * *